United States Patent [19]

Hoffert et al.

[11] Patent Number: 5,047,853
[45] Date of Patent: Sep. 10, 1991

[54] METHOD FOR COMPRESSSING AND DECOMPRESSING COLOR VIDEO DATA THAT USES LUMINANCE PARTITIONING

[75] Inventors: Eric M. Hoffert, San Francisco, Calif.; Lee S. Mighdoll, Chagrin Falls, Ohio

[73] Assignee: Apple Computer, Inc., Cupertino, Calif.

[21] Appl. No.: 495,331

[22] Filed: Mar. 19, 1990

Related U.S. Application Data

[63] Continuation-in-part of Ser. No. 495,428, Mar. 16, 1990.

[51] Int. Cl.⁵ .............................................. H04N 7/12
[52] U.S. Cl. .................................. 358/133; 358/136; 358/11; 358/12; 358/13
[58] Field of Search ............... 358/133, 136, 13, 13 C, 358/12, 11; 382/56

[56] References Cited

U.S. PATENT DOCUMENTS

| | | | |
|---|---|---|---|
| 4,319,267 | 3/1982 | Mitsuya | 358/13 |
| 4,528,584 | 7/1985 | Sabri | 358/13 |
| 4,580,134 | 4/1986 | Campbell et al. | 358/133 |
| 4,743,959 | 5/1988 | Frederiksen | 358/133 |
| 4,797,729 | 1/1989 | Tsai | 358/13 |
| 4,816,901 | 3/1989 | Music | 358/133 |
| 4,843,466 | 6/1989 | Music | 358/133 |
| 4,857,991 | 8/1989 | Music et al. | 358/13 |
| 4,954,879 | 9/1990 | Heckt | 358/13 |
| 4,965,754 | 10/1990 | Stansfield et al. | 358/133 |
| 4,965,845 | 10/1990 | Chan et al. | 358/133 |

Primary Examiner—Howard W. Britton
Assistant Examiner—Sherrie Hsia
Attorney, Agent, or Firm—Blakely, Sokoloff, Taylor & Zafman

[57] ABSTRACT

A data compression method which recognizes the adverse conditions of duochrominance-isoluminance and nonlinear color distribution. A mxn block of pixel data is examined to compute two colors and a bitmap which best represent the block generally using a luminance partitioning technique. The original data and the compressed data are examined to determine if the resultant decompresssed image will contain artifact associated with duochrominance-isoluminance or nonlinear color distribution. If these artifacts will occur in the decompressed data, the decompressed data is not used but rather the block is represented by storing the color of each pixel. This method produces compressed images of excellent quality.

12 Claims, 10 Drawing Sheets

FIG _ 1  ADAPTIVE CODING FORMAT (FIRST WORD)

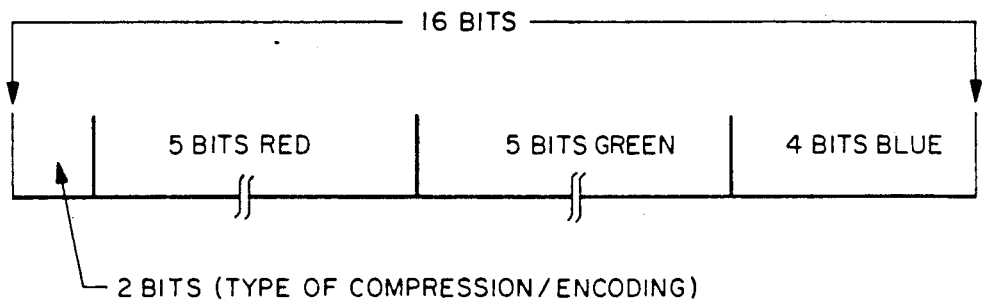

```
|←——————————— 16 BITS ———————————→|
| 5 BITS RED | 5 BITS GREEN | 4 BITS BLUE |
```

— 2 BITS (TYPE OF COMPRESSION/ENCODING)

FIG _ 2  CODING FOR COMPRESSION/ENCODING

00 → 4×4 PIXEL BLOCK OF ONE COLOR
(16 BITS) → (FIG 1/FIRST WORD)

01 → BLOCKS OF SAME COLOR (RUN LENGTH BLOCKS)
(24 BITS) → (FIG 1/FIRST WORD + 8 BITS OF LENGTH)

10 → BLOCK OF TWO COLORS
(48 BITS) → (FIG 1/FIRST WORD + 16 BITS 2ND COLOR
+ 16 BITS OF BIT MAP)

11 → BLOCK OF FOUR COLORS
(64 BITS) → (FIG 1/FIRST WORD + 16 BITS 2ND COLOR
+ 32 BITS/DOUBLE BITMAP)

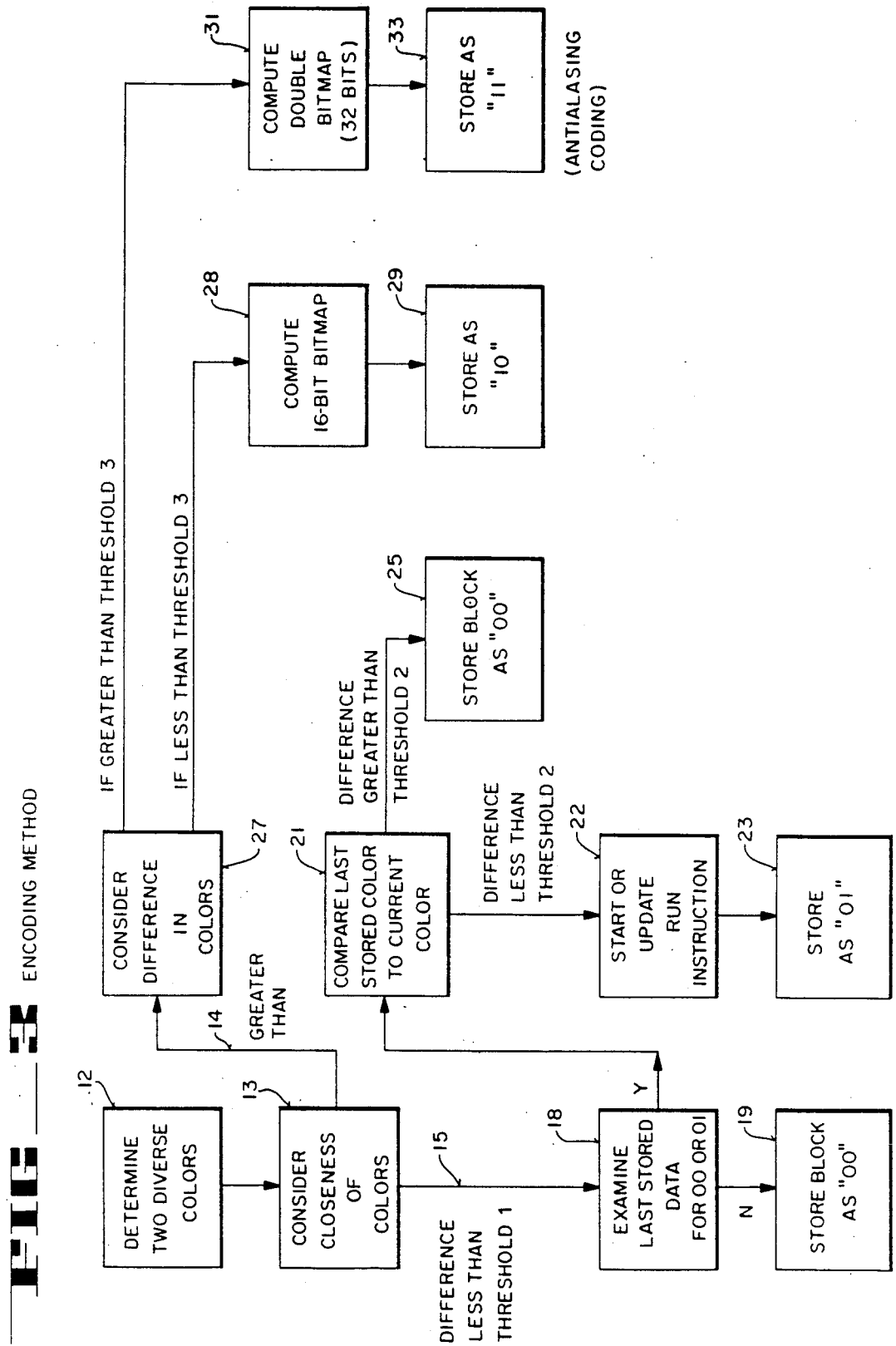

FIG_4A (PRIOR ART)
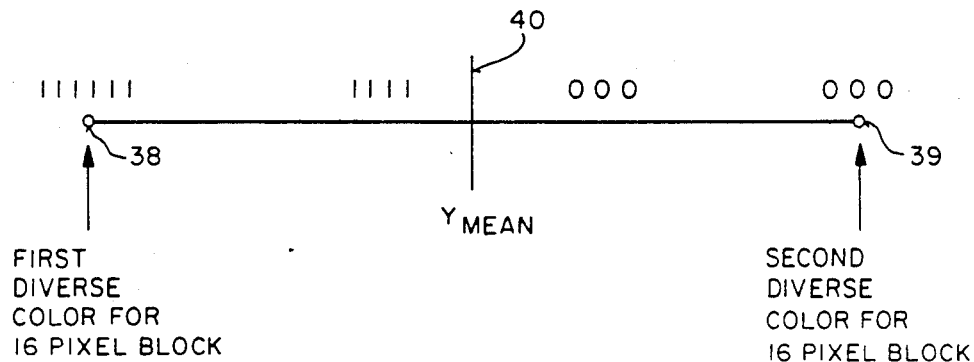
FIG_4B (PRIOR ART)
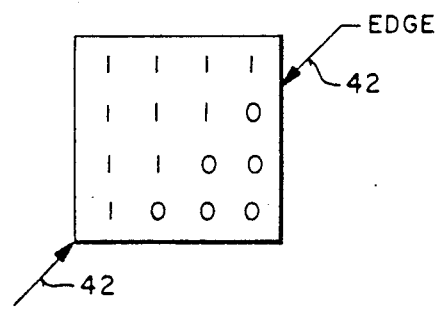
FIG_5A
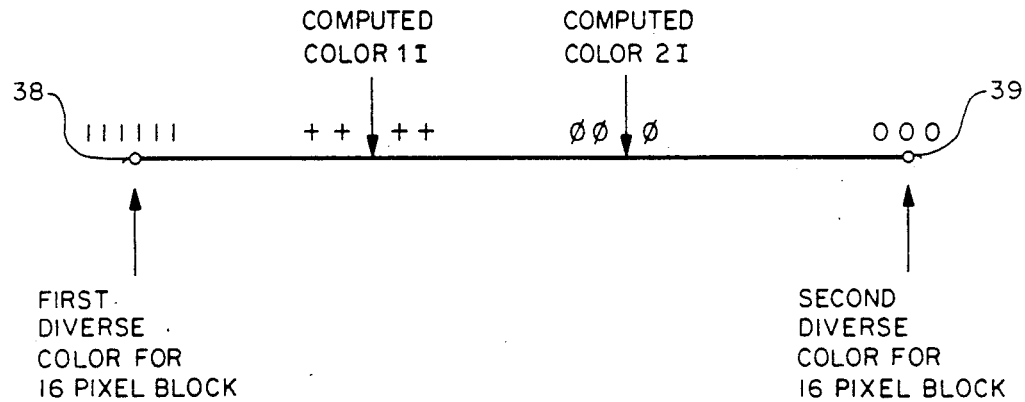
FIG_5B
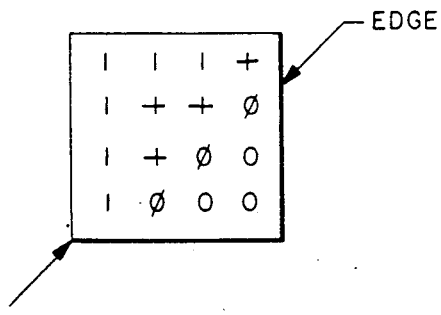

FIG_6
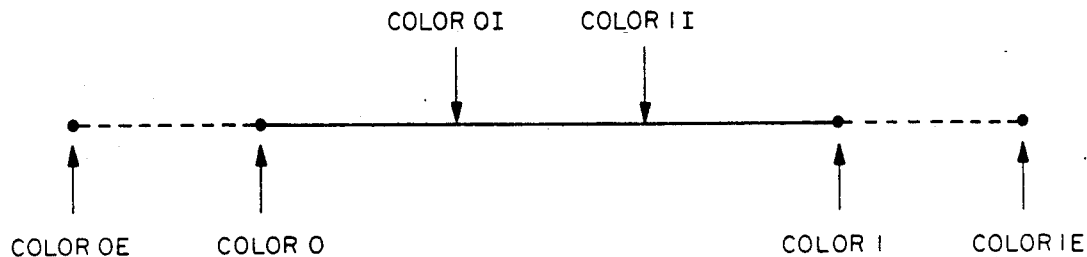
Δ = DIFFERENCE BETWEEN COLOR O AND COLOR I
COLOR OE = COLOR O − ΔK
COLOR IE = COLOR I + ΔK
COLOR OI = 2/3 COLOR OE + 1/3 COLOR IE
COLOR II = 1/3 COLOR OE + 2/3 COLOR IE
FIG_7
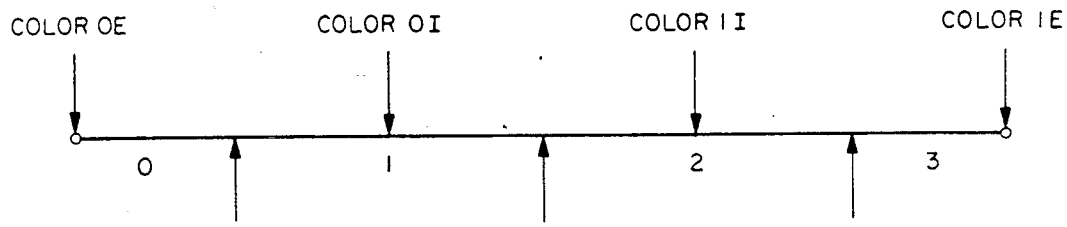
$$Y_{BAND\ 0} = 1/2\ (Y_{OE} + Y_{OI})$$
$$Y_{BAND\ 1} = 1/2\ (Y_{OI} + Y_{II})$$
$$Y_{BAND\ 2} = 1/2\ (Y_{II} + Y_{IE})$$

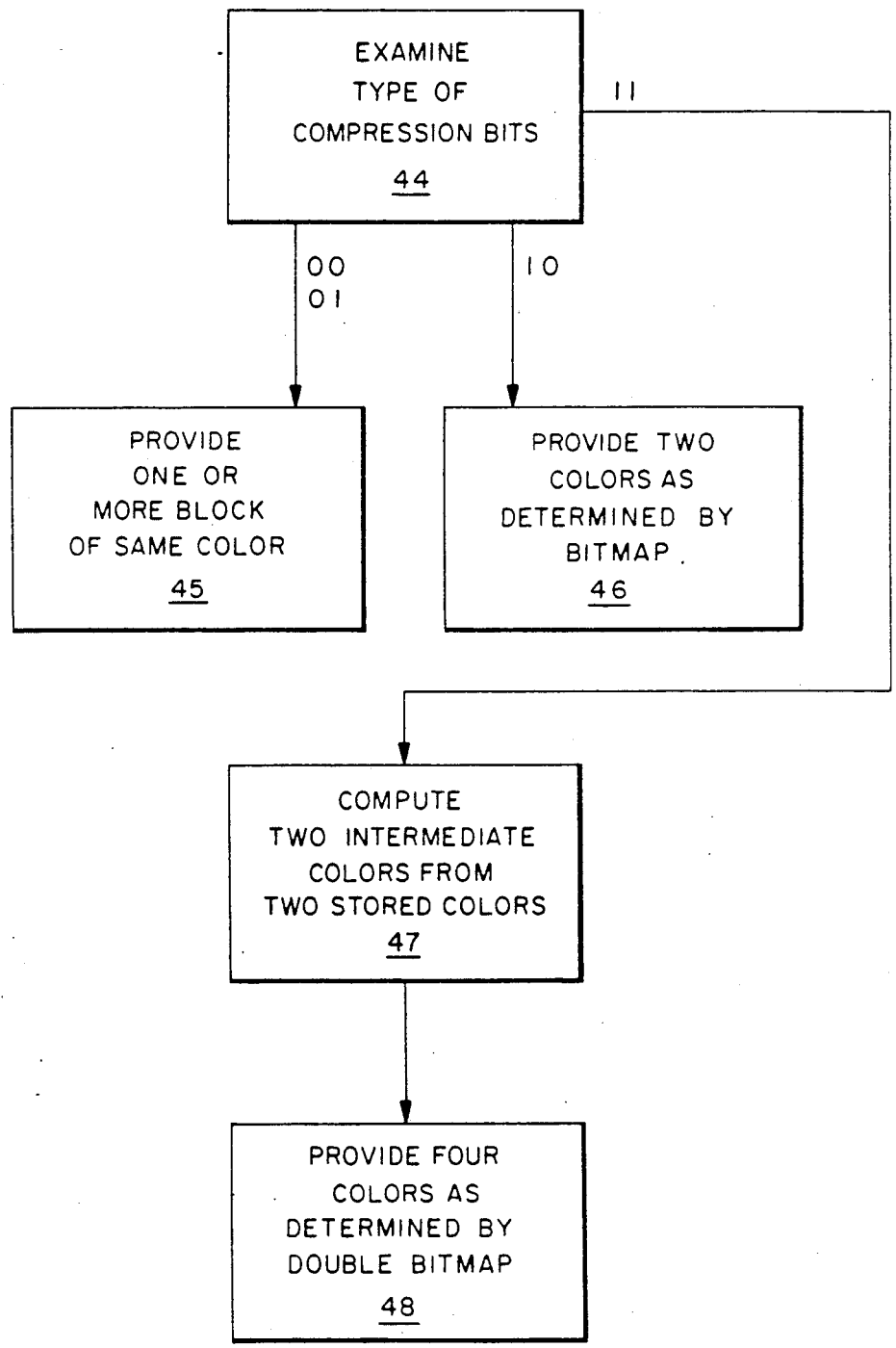
FIG_8 DECOMPRESSING/DECODING METHOD

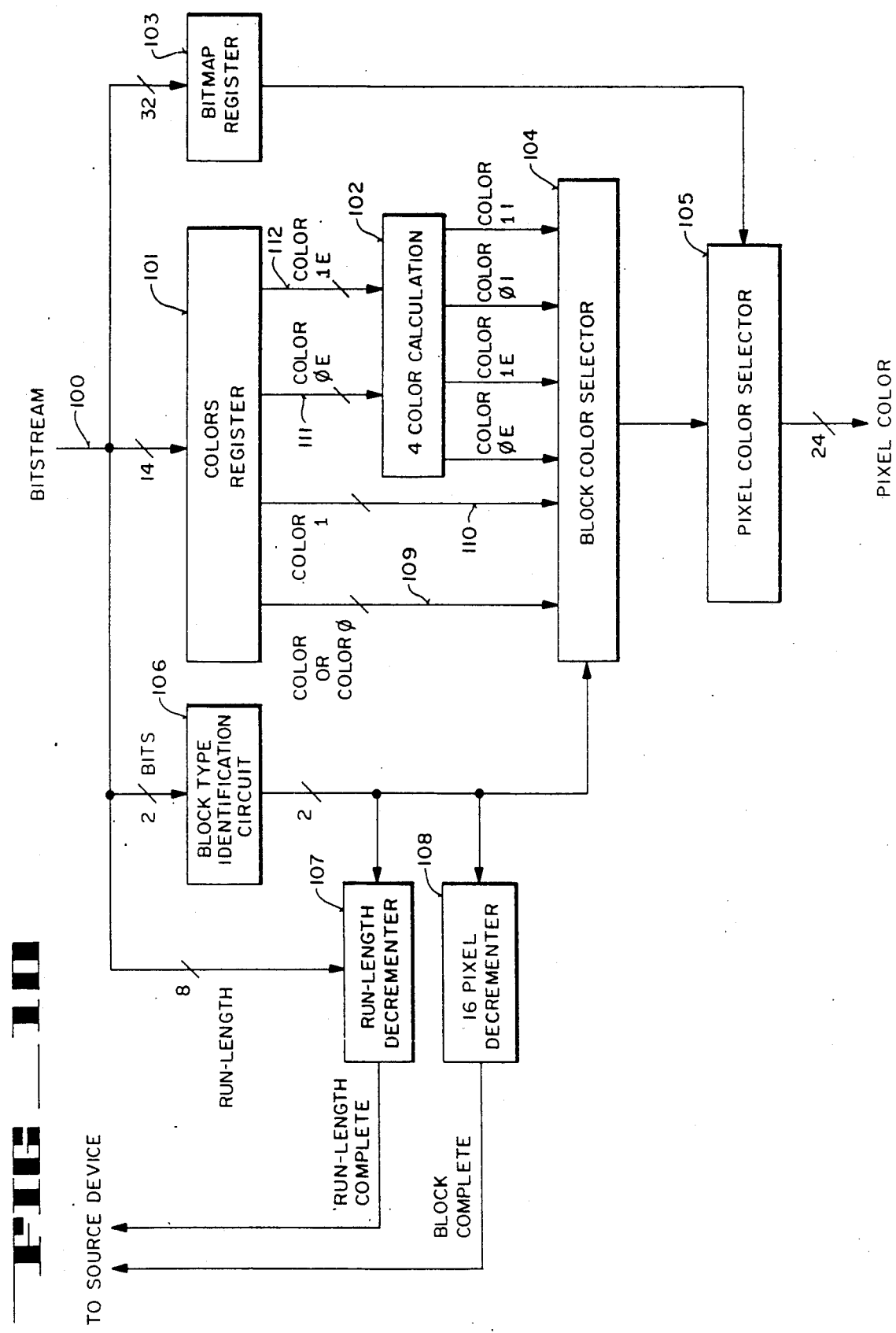

FIG_11
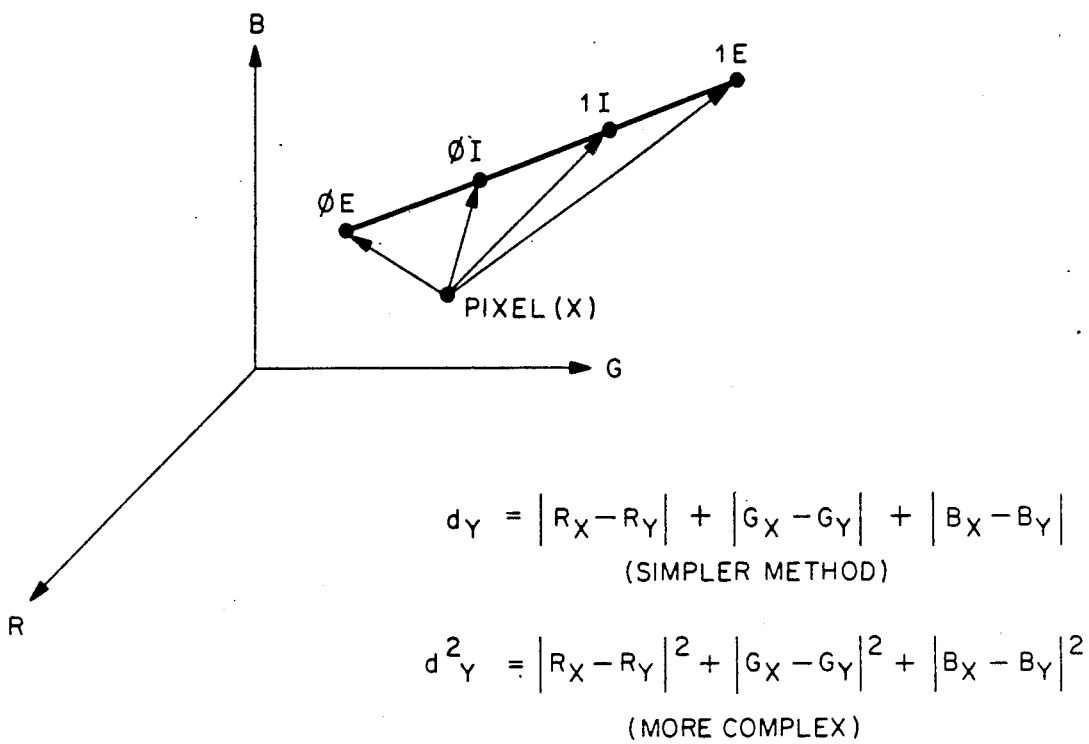
$$d_Y = |R_X - R_Y| + |G_X - G_Y| + |B_X - B_Y|$$
(SIMPLER METHOD)
$$d^2_Y = |R_X - R_Y|^2 + |G_X - G_Y|^2 + |B_X - B_Y|^2$$
(MORE COMPLEX)
FIG_12
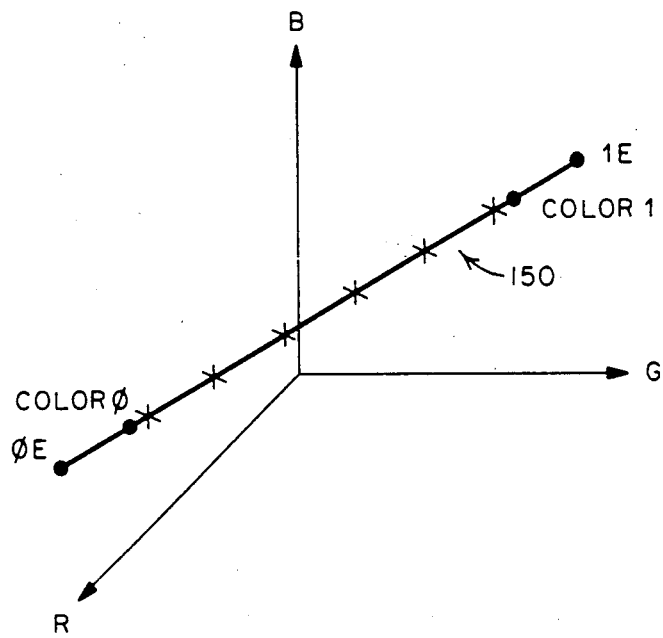

FIG__13
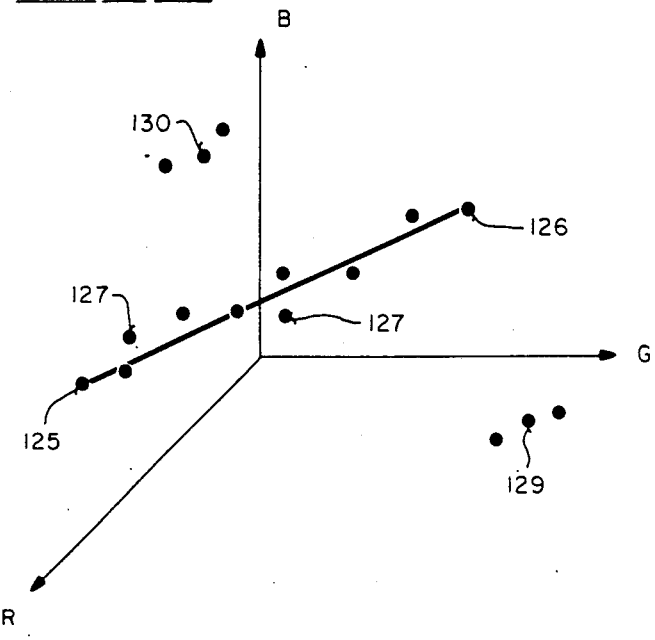
FIG__14
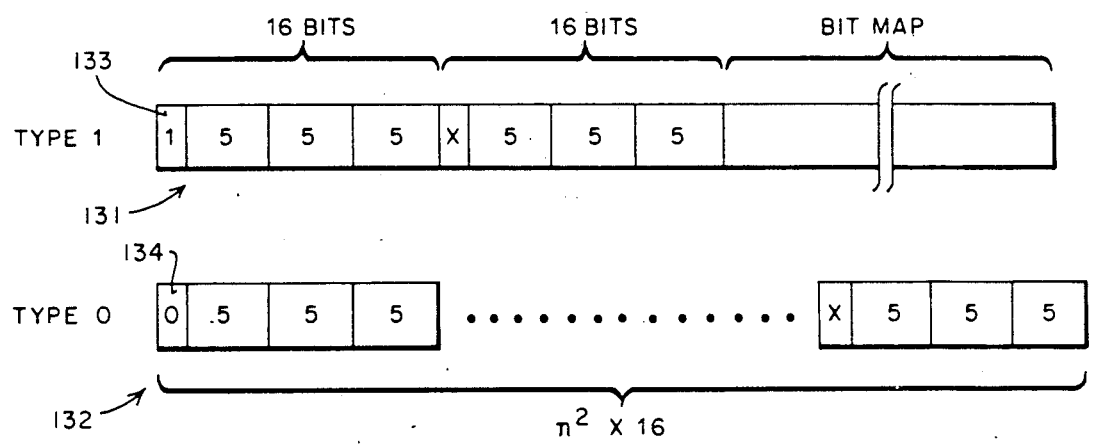

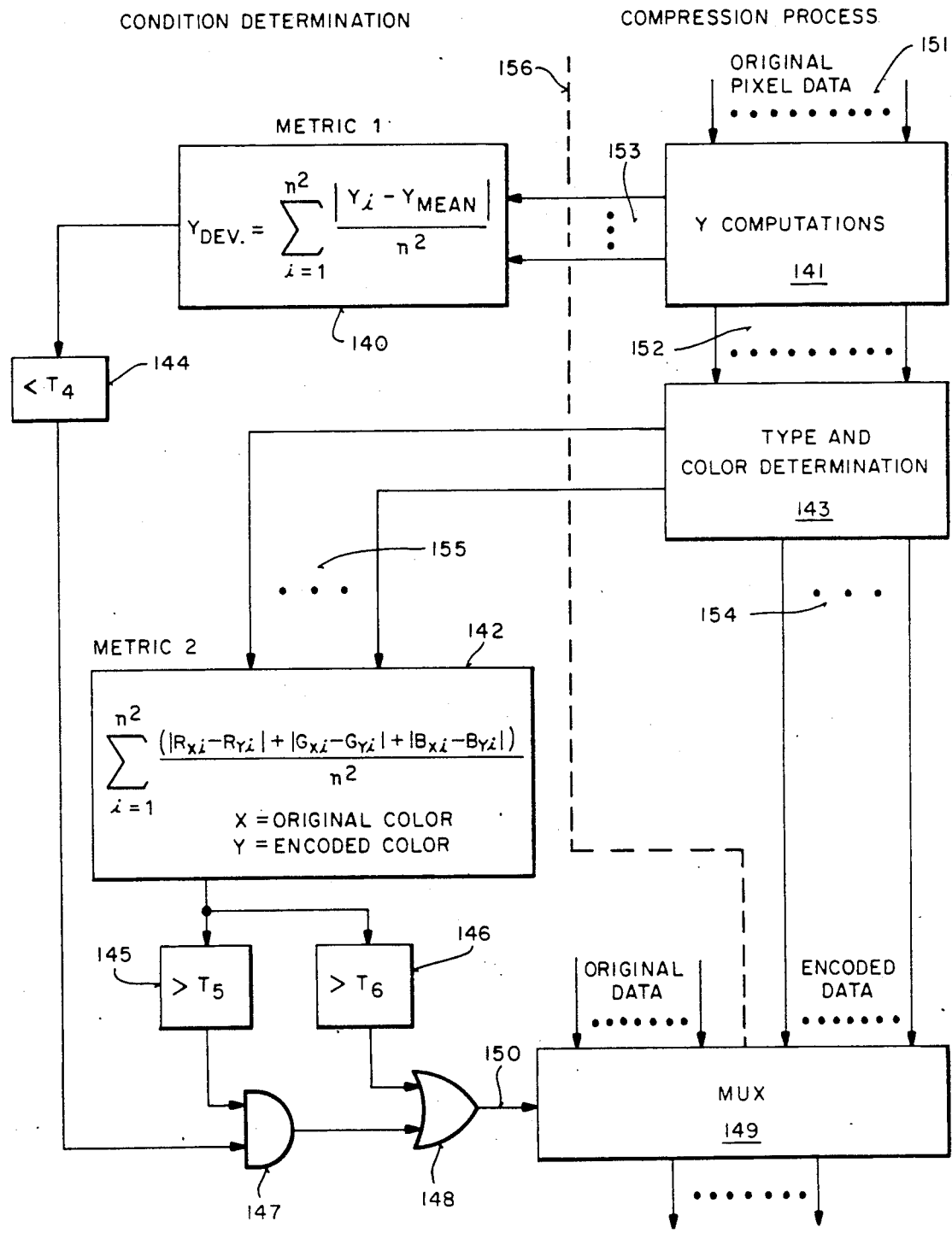
FIG_15

METHOD FOR COMPRESSSING AND DECOMPRESSING COLOR VIDEO DATA THAT USES LUMINANCE PARTITIONING

RELATED APPLICATION

This is a continuation-in-part of application of Ser. No. 495,428 filed Mar. 16, 1990 and entitled Method and Apparatus for Compressing and Decompressing Color Video Data with an Anti-Aliasing Mode.

BACKGROUND OF THE INVENTION

1. Field of the Invention

The invention relates to the field of the compression and decompression of color video digital data.

2. Prior Art

Numerous techniques are known in the prior art for compressing and decompressing digital data. For example, see copending application, entitled VIDEO COMPRESSION ALGORITHM, Ser. No. 441,333, filed Nov. 11, 1989, which is a continuation of Ser. No. 084,309, filed Aug. 11, 1987, now abandoned, and assigned to the Assignee of the present invention.

In some instances, the data is compressed in a uniform manner block-by-block or frame-by-frame. That is, by way of example, m bits of compressed data are used to represent each nxn block of pixel data. In other methods, such as the one used in the present invention, the degree of compression is a function of the characteristic of the video data sought to be compressed. Again, by way of example, it is common to represent a plurality of adjacent pixels of the same color.

As will be seen, the present invention teaches an adaptive compression/decompression method which examines the color video data, block-by-block, and then determines the type of compression to be used for each block. One of the types of compression used in the present invention is similar to that described in U.S. Pat. No. 4,580,134. In general, this type of compression takes a 4×4 block of pixel data and encodes it into two colors and a 16 bit bitmap. The bitmap on a decompression indicates which of the two colors is to be used for each pixel.

Other prior art known to Applicant is disclosed in "Two Bit/Pixel Full Color Excoding", *Siggraph '86*. No. 4, 1986, beginning at page 215 and U.S. Pat. No. 4,743,959.

SUMMARY OF THE INVENTION

An improvement in a compression process which compresses digital color video pixel data by using luminance partitioning for determining compressed color data is described. In such methods, fewer colors are used in the compressed data than are present in the original data. With the improvement, it is determined if blocks in the original video pixel data have duochrominance and isoluminance which are not within a predetermined range. Also, it is determined if these blocks have a nonlinear chrominance distribution which exceeds a predetermined threshold. If either of these conditions exist for a block, the video data is processed by a method which is substantially independent of luminance partitioning. Images compressed by this method are characterized by excellent image quality.

BRIEF DESCRIPTION OF THE DRAWINGS

FIG. 1 is a diagram illustrating the formatting used for the compressed data in the currently preferred embodiment of the invented method.

FIG. 2 is a listing of the two bits used to indicate the type of compression or encoding and the resultant compressed data stored for each type of compression.

FIG. 3 is a block diagram used to describe the compression method of the present invention.

FIG. 4A is a diagram illustrating a prior art method for determining a bitmap where the video data after compression is represented by two colors and a bitmap.

FIG. 4B illustrates a 4×4 block of pixels with a bitmap distributed in the block, this diagram is used to illustrate a problem with the prior art method.

FIG. 5A is a diagram illustrating a novel type of compression used in the adapted method of the present invention. This compression type uses a double bitmap for selecting between four colors.

FIG. 5B is a diagram illustrating a 4×4 block with a double bitmap distributed in the block. This illustrates how the novel compression of FIG. 5A solves the problem illustrated in FIG. 4B.

FIG. 6 is a diagram illustrating another novel aspect of the one type of compression used in the overall method of the present invention. In particular, two diverse colors are extended.

FIG. 7 is a diagram illustrating how a double bitmap is formed when the extended diverse colors of FIG. 6 are used.

FIG. 8 is a diagram illustrating the decompression or decoding method of the present invention.

FIG. 10 is a block diagram of an apparatus for implementing the decompression of the present invention.

FIG. 11 is a diagram illustrating the method used for determining the closest color in RGB space.

FIG. 12 is a diagram illustrating a plurality of intermediate colors, the diverse colors and the extended diverse colors in RGB space.

FIG. 13 is a diagram illustrating both linearly distributed colors and non linearly distributed colors.

FIG. 14 illustrates the formatting used in the currently preferred embodiment when duochrominance-isoluminance and nonlinear color distribution detection is used.

FIG. 15 illustrates the method of the currently preferred embodiment for detecting duochromiance-isoluminance and nonlinear color distribution.

DETAILED DESCRIPTION OF THE INVENTION

Figure 9:
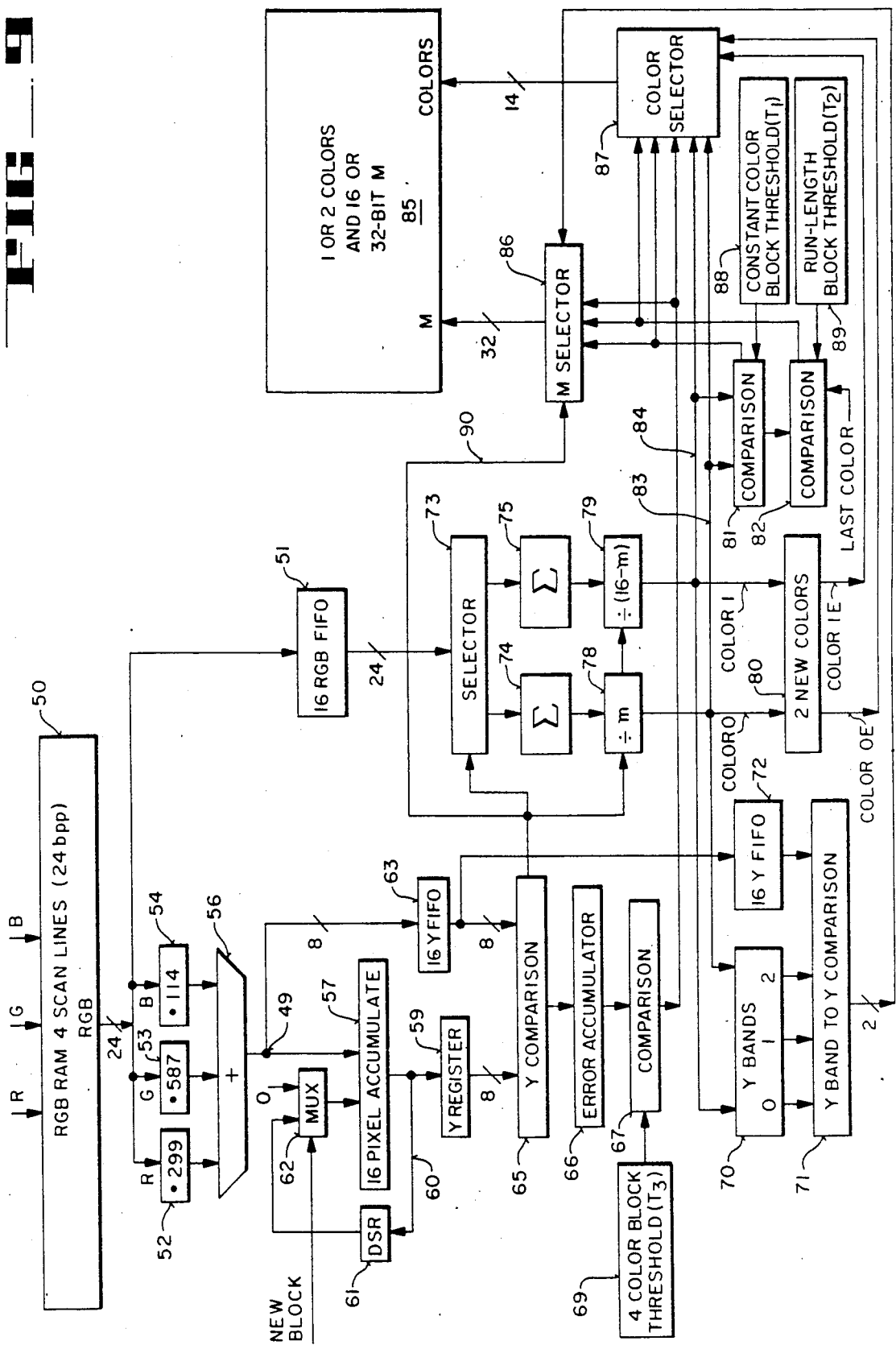
FIG. 9 is a block diagram of an apparatus for implementing the compression of the present invention.

A method and apparatus for compressing and decompressing color video data is described. In the following description, numerous specific details are set forth such as specific number of bits, etc., in order to provide a thorough understanding of the invention. It will be obvious to one skilled in the art, however, that the present invention may be practiced without these specific details. In other instances, well-known methods and apparatuses have not been set forth in detail in order not to unnecessarily obscure the present invention in detail.

OVERVIEW OF THE PRESENT INVENTION

In the currently preferred embodiment of the present invention, digital color video data, more specifically, 8 bits representing the color red (R), 8 bits representing the color green (G) and 8 bits representing the color blue (B) for a raster scanned display are compressed. The video data is compressed by one of four techniques one of which provides anti-aliasing. In general, colors are stored as 5 bits of red, 5 bits of green and 4 bits of blue in the currently preferred embodiment. The RGB-compressed data can be stored, transmitted or otherwise manipulated or handled as is commonly done. The present invention also teaches the decompressing of the video data into a form corresponding to its precompressed form. Sometimes in this application and in the prior art literature, compression is referred to as "encoding" and decompression as "decoding".

In the currently preferred embodiment, 4×4 blocks of color pixel data of a raster scanned display are considered as a group for compression. As will be obvious to one skilled in the art, the size of these blocks is not critical to the present invention, and in fact, nxn blocks may be used. The blocks are considered one after the other in the direction of the scan. In order for this to be implemented, buffering is used to store four scan lines of pixel data so that 4×4 blocks can then be considered.

The compressing and decompressing of the present invention may be done using ordinary programming in any one of a plurality of commercially available microprocessors. Alternatively, the compressing/decompressing can be done using specialized hardware such as described in conjunction with FIGS. 9 and 10.

In the presently preferred embodiment, each 4×4 block is first evaluated to determine which of 4 types of compression/encoding should be used. The selection of one of the four types can be influenced by the setting of certain threshold values. These threshold values may be permanently fixed in a system or may be adjusted by a user. These values control the amount of compression which occurs and as would be expected the quality of the display resulting from the decompressed data. Thus, for example, the user can select less compression (more storage space) and a better quality display as opposed to high compression (less storage) and a lower quality display.

In another embodiment of the present invention, problems which occur when luminance partitioning is used, in particular, the conditions of duochrominance-isoluminance and nonlinear color distribution are detected. When this detection technique is used, the data is stored as either one color per pixel of the original data or when the conditions are not detected as two colors and a bit map.

ADAPTIVE CODING FORMAT OF THE PRESENT INVENTION

As mentioned, four types of compression/encoding are employed with the present invention. Two bits are used to indicate which of the four types of encoding has been used for each of the 4×4 blocks of pixels. In FIG. 1, a typical 16 bit word used in the currently preferred embodiment is illustrated. This 16 bit word is sometimes referred to as the "first word" since, in some cases, more than one word is used to define a block of pixels. Alternately, for example, a 26 bit word could be used for the first word with 24 bits defining RGB.

TYPES OF COMPRESSION/ENCODING USED IN THE CURRENTLY PREFERRED EMBODIMENT OF THE ADAPTIVE COMPRESSION/ENCODING METHOD AND APPARATUS

In the currently preferred embodiment, as mentioned, 4 types of encoding are employed. The code "00" at the beginning of the 16 bit word of FIG. 1 is used to indicate that a 4×4 block of color pixel data is represented in its compressed form as a single color. For this type of encoding, the RGB data simply follows the code "00" with, as illustrated in FIG. 1, 5 bits representing the color red, 5 bits representing the color green and 4 bits being used to represent the color blue. This type of decoding, as will be discussed, is used when the pixels in a block are all close to the same color.

As will be discussed in greater detail, a plurality of blocks may sequentially occur of the same color. In this event, in addition to the 16 bits shown in FIG. 1, an additional 8 bit word is used to provide a run length instruction. The code "01" at the beginning of the first word indicates a run length instruction. The 14 bits following indicates the color, and the following 8 bits indicate the number of consecutive blocks of the same color. If more than 256 blocks occur of the same color, a second run instruction is used.

The code "10" at the beginning of the first word indicates that a single block of pixels is represented as two "diverse" colors and a 16 bit bitmap. A total of 48 bits is used for this representation and includes the first word as shown in FIG. 1 leading off with the code "10", with the remaining 14 bits of this word indicating the first color. The next 16 bits indicates the second color. Here, three 5 bit words may be used for RGB or one bit may be used for another purpose. Following the second color, a 16 bit word (bitmap) indicates which of the two colors to be used for each of the pixels in the 4×4 block. This coding scheme is described in U.S. Pat. No. 4,580,134.

There is a problem which occurs with the encoding described in the previous paragraph for the two color block which is described in conjunction with FIG. 4B.

In the currently preferred method, where the two diverse colors are separated by a threshold amount which may be a fixed amount or an amount adjusted by the user, a different type of encoding is used. This type of encoding is indicated in the first word by the code "11". In effect, the block of pixel data is represented by four colors and a 32 bit (double) bitmap. The bitmap indicates which one of the four colors is to be used for each pixel on decoding. Importantly, four colors are not in fact stored, but rather, only two colors are stored. The second two colors (intermediate colors) are computed. For this type of coding, 64 bits are used for each 4×4 block. The first word leads with the code "11" to indicate the type of encoding, followed by 14 bits representing the first color. The second color is represented by the following 16 bits and finally, 32 bits representing the double bitmap. This type of encoding, described in more detail in conjunction with FIGS. 5A and 5B, provides anti-aliasing which will be better understood when the problem associated with the prior art (FIG. 4B) is discussed. Also this encoding provides excellent results when used to compress all the color data.

COMPRESSION/ENCODING METHOD OF THE PRESENT INVENTION

Referring now to FIG. 3, the method of the present invention, particularly as it relates to the adaptive encoding is described.

As indicated by step 12 for each block of pixel data (e.g., 4×4 block of pixels) two diverse colors for the block are determined. In the currently preferred method, these colors are determined by first converting the RGB values associated with each of the pixels into their corresponding luminance value. Luminance may be determined for NTSC systems from the equation $$Y = 0.299R + 0.587G + 0.114B$$

The average or mean luminance is then computed for the 16 pixels. The luminance for each pixel is compared with the mean luminance. The average RGB values for the pixels having luminance values above the mean value is determined and this RGB value is one of the diverse colors. The average RGB values for the pixels having luminance values below the mean value is also determined and this RGB value is the other of the diverse colors.

As indicated by step 13, the closeness of the two diverse colors is considered. If the colors are very close (as determined, by way of example, by their Y value), they may be considered a single color. A fixed threshold value or a user selected threshold value may be used to determine whether the two diverse colors are to be considered one color or two colors (this threshold value is shown as T1 in FIG. 9). Line 15 of FIG. 3 illustrates the steps used if the difference between the two colors is considered to be less than the threshold value (i.e., the colors are close) and line 14 indicates the path where the colors are considered to be different (i.e., greater than the threshold value).

In the consideration of the threshold value in this application, the case where the difference in colors is equal to the threshold value is not discussed. Discussions in the method are shown based on "greater than" or "less than" the threshold value. It is a somewhat arbitrary decision to decide in a particular implementation that where the difference in colors is equal to the threshold value, it should be treated as either greater than the threshold or less than the threshold value.

Assume that for a particular block of pixel data, the difference between the colors is less than the threshold T1 (line 15). For this case, the block of pixels under consideration is stored as a single color with a type code "00" as indicated in FIG. 2, or with a type code "01" for a run of the same color blocks.

As shown in step 18, the type code for the last considered block is examined to determine if the type of compression was "00" or "01". Assume first that it is not either of these types of compression. Then following the "N" (no) line, step 19 applies; that is, the pixel data for the block is stored as a single color preceded by the code "00".

If, on the other hand, the last block was a "00" or "01" type compression, following the "Y" (yes) line, step 21 applies. The color of this previously considered block is examined and compared to the color of the block under consideration. In practice, the compressed data for the previous block can be accessed from memory or this data can be retained in a register until it is determined that the run of blocks has ended or that the number 256 has been reached for the 8 bit run instruction.

The color for the current block and the previous block are compared. Once again, a fixed threshold value or a user settable threshold value can be used to reach a determination as to whether the colors are different or the same. (This threshold value is shown as T2 in FIG. 9.)

Assume now that as a result of step 21, the difference in colors is less than threshold 2. As indicated by step 22, a run instruction is started or updated. That is, if the data for the previously stored block is stored under the code "00", the code is changed to "01" and 8 bits are added and coded to indicate that this is the second block of the same color. If the data for the previously stored block is already stored under the coding of "01" the run length field is updated to indicate another block of the same color. The data as indicated by block 23 is stored under the compression type "01".

If the difference in color as determined by step 21 is greater than the threshold 2 indicating that the color of the current block is different than that of the previously stored block, the new color is stored for the block under the code "00" as indicated by step 25.

Consider now what occurs if the results of steps 13 indicate that the colors are greater than threshold 1 as indicated by the path 14. As indicated by step 27, the difference between the colors is again considered to determine whether the difference is greater than or less than a third threshold. Once again, this third threshold may be a fixed set value or one selectable by the user. If the difference between the two colors is greater than the third threshold, the block is stored as two colors and a double bitmap as indicated by blocks 31 and 33. If the colors are less than the threshold 3, the data for the block is stored as two colors and a single 16 bit map as indicated by steps 28 and 29.

The specific computation used to compute the 16 bitmap of step 28 is discussed later in this application. In general, the luminance associated with each pixel is compared to the mean luminance for the 16 pixels in the block. If the luminance for a particular pixel is below the mean value, one binary state is stored for the pixel, whereas if the luminance is above the mean value, the other binary state is stored for the pixel. These two states determine which one of the two diverse colors is used on decoding. More specifically, if the luminance value for a particular pixel is less than the mean value, then the diverse color computed from those pixels with values below the mean luminance is associated with that pixel. On the other hand, if the luminance value for a particular pixel is above the mean value, then the other diverse color is associated with that pixel. As shown by step 29, the data for this block is stored with the header "10".

The computation for the double bitmap as shown by step 31 is discussed in more detail later in this application. In general, in the currently preferred embodiment the two diverse colors are first used to determine two extended diverse colors. Then, two intermediate colors are computed. The luminance for each pixel is then compared to the 4 colors and for each pixel, 2 bits are used to associate which of the 4 colors most closely matches a particular pixel's color. The result of this consideration provides the 32 bit double bitmap for the 4×4 block of pixels. Only two colors, for example, the two extended diverse colors are stored along with the 32 bits for the bitmap under the heading "11" as indicated by step 33. On decoding, the two intermediate colors are recomputed from the extended diverse colors and the double bitmap is used to select one of the four colors for each of the pixels.

PROBLEM ASSOCIATED WITH THE PRIOR ART COMPRESSION (TYPE "10")

As previously mentioned, the type of compression identified in this application by the code "10" is described in U.S. Pat. No. 4,580,134. This technique is illustrated in FIG. 4A. First, the luminance for each of the 16 pixels is computed and a mean or average luminance is determined. The average luminance is shown by line 40 in FIG. 4A. The first diverse color shown by point 38 is the color associated with the lower luminance colors. The second diverse color, point 39, is the color associated with the higher luminance colors. Those pixels with luminance less than the mean are shown by "1"; the pixels having a luminance greater than the mean are shown by "0". In the distribution of the pixels of FIG. 4A, seven of the pixels are closer to the mean luminance than the other 9 pixels (four of the "closer" pixels are to the left of the mean value and three are to the right of the mean value). The remaining pixels are closely distributed either near point 38 or point 39. In FIG. 4B, the distribution of these colors is shown in the 4×4 block. The upper part of the block on decoding has one color and the lower part of the block another color. These two colors define an edge or interface 42. Unfortunately, since the colors are relatively far apart for the example shown, the interface between the colors in the block will be "hard" and "ragged". The problem, of course, becomes worse as the difference in the colors becomes greater. One solution to this problem suggested by the prior art is to determine and store 4 colors and to use double bitmaps (see column 5, beginning at line 14 of U.S. Pat. No. 4,580,134). The unique solution used in the present invention is described below.

ANTI-ALIASING CODING (TYPE "11")

Referring to FIG. 5A, assume the two diverse colors are the same as for FIG. 4A (colors 38 and 39) and that the distribution of colors is the same as in the example of FIG. 4A and 4B. In the currently preferred embodiment, two additional colors (intermediate colors) color 1l and color 21, are computed from the diverse colors 38 and 39. Then, the luminance associated with each pixel is compared to the luminance of each of the four colors, and each pixel is assigned the color it is closest to. This assignment or association of one of four colors to each pixel requires 2 bits per pixel. In FIG. 5A, the pixels closest to color 38 are represented by "1", the pixels closest to color 1l by "+", the pixels closest to color 21 by "φ", the pixels closest to color 39 by "0".

In FIG. 5B, the distribution of the colors is shown for the 4×4 block. In comparing FIGS. 4B and 5B, it should be noted that in both cases in the upper lefthand corner of the block, the predominant color is color 38 and in the lower righthand corner of the block, the predominant color is color 39. However, in FIG. 5B, the intermediate colors are distributed along the interface, in effect, softening the transition or more specifically providing the anti-aliasing of this coding compression technique. The currently preferred embodiment of this technique is described in conjunction with FIGS. 6 and 7.

PREFERRED METHOD FOR TYPE CODE 11

In FIG. 6, the diverse colors previously discussed are shown as "color 0" and "color 1". As mentioned, these colors may be determined by averaging all those colors below a mean value and all those colors above the mean value. In the currently preferred method, these two diverse colors are extended when the double bitmap is used. The extended colors are shown as color 0E and color 1E. The extended colors are determined by first finding the difference between color 0 and color 1. The extended color—color 0E, is the color 0 less the difference times a constant K. And similarly, the color 1E is equal to the color 1 plus the "difference" times the constant "K". The colors 0E and 1E are computed in RGB space, that is, the extending factor "ΔK" is applied separately to R, G and B. In the currently preferred embodiment, K is equal to 0.125.

Next the intermediate colors shown in FIG. 6 as color 0l and color 1l are computed. The formulas for computing these colors in the currently preferred embodiment are also shown in FIG. 6. This computation is also performed in RGB space.

Once these four colors are determined, it is now necessary to determine the closest color for each pixel. This is done by dividing the "color space", that is, space between color 0E and color 1E into four bands 0, 1, 2 and 3 as shown in FIG. 7. In the currently preferred embodiment, this computation is done in the luminance space. Band 0 as shown in FIG. 7, is equal to ½ the luminance associated with color 0E and color 0l. Similarly, the Y band 1 is equal to ½ the luminance associated with color 0l and ½ the luminance associated with color 1l. If, by way of example, the luminance for a particular pixel is below the luminance for Y band 0, that pixel is assigned to color 0E. If the luminance is between Y band 0 and Y band 1, it is assigned the color 0l. Similarly, if it is between Y band 1 and Y band 2, it is assigned the color 1l, and finally, if it is above Y band 2, it is assigned color 1E. Two bits are used to represent each of these colors, and hence, a 32-bit bitmap is prepared, representing which one of the four colors is associated with each of the pixels.

Alternately, the appropriate color can be selected in RGB space. In FIG. 11 the extended diverse colors and the computed intermediate colors are shown disposed along a line in RGB space along with a pixel X. Assume this pixel is one of the 16 pixels in a block. The RGB values of this pixel determine its location in the RGB space. Note that the pixel does not fall on the line defined by the extended diverse colors. This is to be expected since these colors were determined by an averaging process. The distance from pixel X to each of the colors (two extended diverse colors and two intermediate colors) is computed in this three dimensional space. The color closest to pixel X is the color which is selected for the pixel. This is done for each of the pixels in the block.

FIG. 11 illustrates two equations which may be used to determine the distance $d_y$ from the pixel to each of the colors. In the simpler method, the absolute values of the differences between the red, green and blue components of the pixel under evaluation and the RGB values for each color is determined and the sum considered as the distance. A more rigorous determination of the distance is also shown in the second equation of FIG. 11 where the differences in the red, green and blue components are squared, summed and the square root of the sum used as representing the distance.

EXTENSIONS TO ANTI-ALIASING CODING

Previous discussions in this application have emphasized the use of a 4×4 block and the 32-bit bitmap for the type 11 coding. Moreover, the discussions have been directed towards an adaptive system which uses one of a plurality of different coding techniques.

The type 11 coding can be used with excellent results as the only coding mode in a compression/decompression system. That is, all of the video data can be compressed, stored and decompressed using the type 11 compression. Note when this is done the two bits indicating the type of compression are not needed and, for example, where 24 bits are used to represent the compressed data, 8 bits can be used for R, 8 bits for G and 8 bits for B.

Previously, discussions have centered on computing two intermediate colors. In fact, any number of intermediate colors can be computed by simply computing equal distances along the line between either the diverse colors or, as currently preferred, the extended diverse colors. In FIG. 12 a line 150 is shown in RGB space which extends between the extended diverse colors. Six X's (along the line along with the extended diverse colors) are used to illustrate an example where 8 total colors are used to represent a 4×4 block. In this case, three bits per pixel are required in the bitmap to identify which one of the 8 colors is associated with each of the pixels. Once again, the appropriate color for each pixel may be selected in RGB space as shown in FIG. 11 or in the luminance domain as previously described. A 4×4 block can also be represented with 14 intermediate colors for a total of 16 colors and a 4-bit per pixel bit map (64 bits for the 4×4 block). Note that in each of these representations only two colors are stored and all the other colors, the intermediate colors, are computed. Thus, the additional storage required is for the bitmap only.

Blocks of 8×8 pixels have also been successfully represented with this technique. For instance, two extended diverse colors and two intermediate colors and a 128-bitmap can be used to represent the 8×8 block. Particularly good results have been obtained where a 3 bit per pixel bitmap is used along with 6 intermediate colors (192-bit bitmap) for an 8×8 block. Alternately, for better definition 14 intermediate colors can be used and a 256-bit bitmap. Once again, as in the previous case, only 2 colors are stored and the intermediate colors computed on decompression.

DECOMPRESSION/DECODING METHOD

In FIG. 8, the method for decompressing/decoding is illustrated. In step 44, the encoded data is examined first to determine the type of coding used. If the type of coding is either 00 or 01, then one or more blocks of the color associated with the code is duplicated for the 16 pixels of each of the blocks (step 45). On the decoding, as well as the encoding, 4 scan lines are encoded/decoded at one time, thus, by way of example, temporary storage for 4 complete scan lines is used.

If the type of compression is "10", the two colors are gated into the memory storing the 4 lines of 4 scan lines under control of the bitmap. This step is indicated by step 46.

Finally, if the coding type is "11", then the two intermediate colors are first calculated (step 47) and the double bitmap is used to gate the 4 colors into the buffer to form the 4×4 block, as indicated by step 48. The equation shown in FIG. 6 for color 01 and Color 11 are again used.

APPARATUS FOR PERFORMING THE INVENTED COMPRESSION

As previously mentioned, the invented compression and decompression may be performed in a general purpose computer, such as a microprocessor, under control of a program. Ordinary programming may be used to implement the invented method. The compression and decompression may also be performed by "hardwired" logic. An apparatus for performing the compression is shown in FIG. 9 and an apparatus for performing the decompression is shown in FIG. 10.

In FIG. 9, a buffer 50 stores four scan lines of a raster scanned display. For the described embodiment, each pixel is 24 bits deep (RGB data). The apparatus of FIG. 9 considers one 4×4 pixel block at a time, and after the data for that block has been compressed, goes on to consider the next block in the direction of the scan.

The bits representing each pixel for each block are read from the buffer 50 through the multipliers 52, 53 and 54. These multipliers multiply the red signal by 0.299, the green signal by 0.587 and the blue signal by 0.114. The output of the multipliers of 52, 53, and 54 are summed in summer 56 and the results of this summation (on line 49) is the luminance. This luminance is computed pixel-by-pixel and accumulated in the accumulator 57. The path 60 and register 61 allow accumulation through the multiplexer 62 to be averaged (divided). Moreover, after each block the multiplexer 62 allows the accumulator 57 to be "zeroed". The Y register 59 then stores the average luminance for the pixels in the block. The luminance value for each pixel (on line 49) is stored in the first-in, first-out register 63. The Y comparator 65 compares the average value of the luminance (from register 59) with the luminance of each of the pixels (from the register 63). The results of this comparison provide a control signal to control the selector 73. Also, the signal on line 90 is a bitmap for the type 10 comparison and can be stored in memory 85. This bitmap is used if it is determined that the block is to be compressed with type 10 compression.

The actual RGB values for each of the pixels are stored in the first-in, first-out register 51. The output of this register provides an input to the selector 73. If the results of the comparison from the comparator 65 show that a particular pixel's luminance is below the mean, the output from the register 51 is directed into the summer 74. Otherwise, the output from the register 51 is directed into the summer 75. After all the values from the register 51 have been summed in either the summer 74 or 75, the output of these summers are divided by the dividers or shifters 78 or 79. The signal at the output of the comparator 65 is used by the shifters 78 and 79 as a "count". That is, by way of example, if the selector 73 has directed the pixel data for 10 pixels into summer 74, and six into summer 75, shifter 78 divides the output of summer 74 by 10 and shifter 79 divides the output of summer 75 by 6. The output of the summers 78 and 79 are the diverse colors, color 0 and color 1, respectively.

The color 0 (on line 83) and color 1 (on line 84) are applied to a comparator or comparison means 81. This comparison means receives the first threshold value (T1 from block 88). (This comparison can be done either in the luminance space by comparing the luminance of the two colors or in RGB space by accumulating the difference between the RGB values for the two colors. Other criteria may be used to determine the difference (or closeness) between two colors. For example, red may be given more or less weight for a particular display.) If the difference of the colors on the lines 83 and 84 are less than the threshold value T1, the comparison means 81 so indicates to the color selector 87, and then the colors on the lines 83 and 84 are directed to memory 85. In this event, the comparison means 82 compares the color stored for the last block (assuming it was a single color) with the current color. If these colors are less than threshold 2 (T2 is stored in the block 89) then a run instruction is needed. The output of the comparison means 82 directs the M selector 86 to either begin a run instruction or update the last run instruction.

For the illustrated embodiment, the difference between the mean luminance value from register 59 and each of the luminance values for the pixels is accumulated from the comparator 65 in an error accumulator 66. If the results of this accumulation, as determined by the comparison means 67, exceeds the threshold T3 (stored in block 69), the output of the comparison means 67 signals the color selector 87 and the selector 86 to indicate double bitmap and extended colors will be stored. This is a different way for selecting between "10" and "11" codings than previously discussed. The extended colors are computed by the new color block 80 using the equations shown in FIG. 6. These colors are selected by the color selector 87 for storage in memory 85. The three Y band luminance values shown by the equations in FIG. 7 are computed by the Y bands block 70. These values can be determined either directly from the RGB values on lines 83 and 84 or from the output of the block 80 when coupled through the color selector 87 to block 70.

The output of the FIFO register 63 is coupled to another FIFO register 72. The luminance for each pixel is thus available for comparison in the Y band to Y comparison means 71 to see which of the bands each pixel falls into. Two bits are provided at the output of comparison means 71 for each pixel which bits are coupled through the map selector 86 to memory 85.

DECOMPRESSING APPARATUS OF FIGURE 10

The bitstream from the memory storing the compressed data is coupled to the bus 100 of FIG. 10. The "type" bits indicating the type of compression are selected from the bus and coupled to the block type identification circuit 106. Those bits representing color are coupled to the color register 101. Those bits representing the bitmap are coupled to the bitmap register 103. For type 00 and 01 compression a single color is coupled to lines 109. For type 10 compression, the two diverse colors, color 0 and color 1, are coupled to the lines 109 and 110, respectively. In the event that the block is type 11 compression, then the two extended colors from the register 101 are coupled to a calculating means 102 via the lines 111 and 112. The four color calculator 102 computes the intermediate colors, again using the equations shown in FIG. 6. The block color selector 104 is a multiplexer which under the command of the identification circuit 106 selects either the single color, two colors from lines 109 and 110, or four colors for the type 11 encoding. The bitmap data controls selector 105. Selector 105 selects the appropriate color for both the two color and four color cases.

Where the identification circuit 106 detects type 01 coding, the 8 bit run length instruction is stored in the decrementer 107. The output of the decrementer 107 assures that the output of the selector 105 (single color) is repeated for all 16 pixels in the block, and for as many blocks as indicated by the run length instruction.

A 16 bit decrementer 108 counts 16 pixels for each block to indicate when a block is completed. This permits the new data to be coupled to the apparatus of FIG. 10.

The compressing and decompressing apparatuses of FIGS. 9 and 10 may be realized with ordinary components.

For the 16 bit words discussed above, the type 00 compression provides a 24 to 1 compression ratio. The type 01 compression provides typically substantially more than 24 to 1 compression depending on the number of consecutive blocks of the same color occur. The type 10 compression provides 8 to 1 compression, while the type 11 compression provides 6 to 1 compression. For typical non-text images, compression with the disclosed system can be expected to be in the range of 8-15 to 1.

PROBLEMS ASSOCIATED WITH LUMINANCE PARTITIONING

Thus far in this application, several types of compression have been discussed which rely on luminance partitioning. There are problems associated with this partitioning which are discussed below, along with a method for detecting the problems and a method for avoiding the problems.

The first of these problems results when the data sought to be compressed in both duochrominant and isoluminant. That is, for example, each pixel in an nxn block of data may have approximately the same luminance (isoluminance) yet these pixels may have two completely different color components. Referring to the equation for luminance:

$$Y = 0.299R + 0.587G - 0.114B$$

assume that two pixels have no blue component; and, that one of the pixels has only a green component of magnitude 1/0.587, and the other pixel only a red component of magnitude 1/0.299. The luminance of both pixels is equal and yet one has only a red component and the other only a green component. When an nxn block is represented with two colors, for the purposes of compression and all or most of the pixels in the block are duochrominant and isoluminant, then each color will be weighted combination of the actual colors that should represent the block (e.g., weighted combination of a red component and a green component). This in fact, is an incorrect assignment of the colors. On decompression the nxn block looks like a blurred combination of the original two colors, resulting in a very noticeable artifact.

The second problem is associated with multiple chrominance specifically where the colors have a nonlinear distribution. This is best shown in FIG. 13 where two diverse colors, color 125 and 126 are shown defining a line. In the previously discussed luminance partitioning methods, it is assumed that all of the colors in an nxn block (or any other data being considered, such as a mxn block) generally fall along the line such as shown by colors 127 in FIG. 13. When the distribution of the colors is significantly nonlinear, that is some colors fall far off the line such as shown by colors 129 and 130 of FIG. 13, these colors cannot adequately be represented by two diverse colors and intermediate colors since only colors along the line are used on decoding. This problem manifests itself on decoding by producing a block that does not match the original block with extremely noticeable artifacts.

DETECTION OF THE CONDITION OF DUOCHROMINANCEISOLUMINANCE AND THE CONDITION OF NONLINEAR COLOR DISTRIBUTION

In the currently preferred embodiment, the detection of the duochrominance-isoluminance condition and nonlinear color distribution condition requires that two terms be computed (referred to as metric 1 and metric 2). Metric 1 is the sum of the absolute differences between each pixel's luminance and the mean luminance for the pixels under consideration. This metric is shown in FIG. 15 as Ydev (luminance deviation).

The second metric is the average RGB error between the RGB pixel values computed for encoding, and the RGB values of the original pixel data. This metric gives an indication of how far off the encoded colors are from the actual colors. The equation used for this computation is shown in FIG. 15 within block 142.

The duochrominance-isoluminance condition exists when Ydev is less than a predetermined threshold (T4) and the average RGB error is greater than a predetermined threshold (T5). Thresholds T4 and T5 define a range of acceptability. The nonlinear color distribution condition exists when the average RGB error is greater than a predetermined threshold (T6). (In practice T6 is approximately twice the value of T5). As in previous cases, the threshold values T4, T5 and T6 may be fixed in a system or adjusted by the user.

METHOD FOR ELIMINATING PROBLEMS ASSOCIATED WITH DUOCHROMINANCE-ISOLUMINANCE AND NONLINEAR COLOR DISTRIBUTION

In general, the data sought to be compressed is examined for the conditions of duochrominance-isoluminance and nonlinear color distribution. If either of these conditions are found then the data under consideration is represented by a method (including a compression method) that does not rely on luminance partitioning. For example, the original data can itself be stored or truncated data can be stored. That is, for instance, in a 4×4 block once either condition is detected 16 colors may be stored.

The above method may be implemented in the adaptive coding method previously described by adding a fifth coding type to the four coding types previously discussed. When this is done a three bit code is required to identify the five types. In the currently preferred embodiment however, only the "Type II" coding is used in conjunction with duochrominance-isoluminance and nonlinear color distribution detection. Accordingly, in the currently preferred embodiment, an incoming nxn block is stored either as two colors and a bitmap (32 bit bitmaps for a 4×4 block) or the block is stored as nxn colors. (In the currently preferred embodiment, each incoming pixel is represented by 24 bits and each color is stored as 15 bits, thus even for the case where a color is stored for each pixel in a block, the colors are stored in a truncated form. Specifically the five most significant bits for R, G and B are stored).

Referring now to FIG. 15, blocks 141 and 143 shown to the right of the dotted line 156 illustrate the compression process; the blocks and gates shown to the left of the dotted line 156 illustrate the steps and logic associated with the duochrominance-isoluminance and nonlinear color distribution detection.

The block 140 illustrates the steps previously discussed for computing the luminance for each of the pixels under consideration and the mean or average luminance for these pixels. The original (uncompressed) pixel data is shown coupled to block 141 on the lines 151. The luminance value for each pixel and the value of the mean luminance are communicated to block 140 by lines 153. This luminous data and other data required for the particular type of compression being employed are communicated on lines 152 to block 143.

The block 140 illustrates metric 1; the equation shown in the block is solved for example, for an nxn block. This equation, as well as the equation shown in block 142, may be solved with a microprocessor using ordinary programming or with hardware specifically configured to perform the indicated computations.

Block 143 represents the steps for determining which type of compression is to be used (where more than one is used) and the computations to provide the compressed data. For example, the block 143 may represent the steps to obtain the data for the four types of compression previously discussed. In the currently preferred embodiment, as mentioned, block 143 represents the two color compression steps for "Type II".

The RGB values for the extended diverse colors and the two intermediate colors along with the original pixel data (from lines 151) are coupled to block 142 over lines 155. This is the data needed to compute metric 2. The RGB values of the colors that would otherwise represent each pixel on decompression is subtracted from the original color for that pixel, and the sum of the absolute values of these differences are divided by the number of pixels. The computed value (metric 2) is coupled to the threshold means 145 and the threshold means 146. If the value resulting from metric 2 exceeds T5 then a signal is applied to one terminal of AND gate 147. As previously mentioned, if the output of block 140 is less than T4 (T4 is stored in threshold means 144) a signal is applied to the other input terminal of gate 147. If both inputs are present at the inputs to the AND gate 147, the pixels under consideration meet the condition of duochrominance-isoluminance and a signal will be passed through the OR gate 148 to the line 150. This will cause the multiplexer 149 to select the original colors rather than the encoded data on lines 154. If the result of metric 2 exceeds the threshold T6 then an input is present at the other input terminal of gate 148, indicating significant nonlinear color distribution. Again, in this event, the original data is selected by the multiplexer 149. Thus, the original data is selected if either or both conditions are met.

In operation the original pixel data is first coupled to the block 141. The luminance value for each pixel is computed along with the mean luminance. Then Ydev is computed. In the currently preferred embodiment simultaneously with the computation Ydev, the extended diverse colors, intermediate colors and a bitmap are computed as illustrated by block 143. As this is being done or after it is completed, the metric 2 solution takes place. As soon as this occurs, and if either condition is met, then an output will be present on the output of the OR gate 148 selecting the original data. If neither condition is met then the encoded data is coupled to the output of the multiplexer 149.

Other computations may be used for determining the conditions discussed above. For example, the duochrominance portion of the duochrominance-isoluminance condition can more easily be determined when the compression type being used stores only two colors. The sum of the absolute difference between the RGB values of the two colors for this special case represents the signal level applied to the threshold means 145. The extended diverse color may be used for this computation.

FIG. 14 illustrates the formatting used where the incoming (original, uncompressed) data is stored as either compressed data (two colors and a double bitmap) or all colors are stored because one of the conditions are met. First, if neither condition is met the format shown in FIG. 14 for type 1 (format 131) is used. The first bit of the first word (bit 133) is set to a binary one to indicate that the words following represent two colors and a bitmap. As shown, the three 5 bit fields following bit 133 represent the colors for one of the two colors. The following 16-bit word contains the RGB values for the second color. Note the "X" indicates that the bit is not used and hence could have either binary value. The bitmap follows the second color. If one of the two conditions are met, then the first bit of the format 132 is a binary 0 as indicated by bit 134. The words that follow represent the colors for each pixel. And as mentioned, this data is truncated from 24 bits to 15 bits.

On decompression, the bits 133 and 134 determine whether a decompression algorithm is to be used to provide the pixel data or whether the bits that follow this initial bit directly represent the colors.

In examining an ISO standard test set of images, it has been found that between 0.5 percent to 5 percent of the blocks meet the conditions of either duochrominance-isoluminance or nonlinear color distribution. In practice, approximately 2.5 percent of the blocks are identified by the process described above as meeting either condition. With the above-described currently preferred embodiment where the original data is stored as either two colors and a bitmap or as the original colors, an overall compression ratio of approximately 5 to 1 is realized. This method produces images of exceptionally high image quality.

I claim:

1. In a compression method for compressing digital color video pixel data which uses luminance values for determining compressed color data where fewer colors are used to represent the compressed data than are found in the data presented for compression, an improvement comprising the steps of:
   determining if the video pixel data presented for compression has duochrominance and isoluminance which are not within predetermined limits of duochrominance and isoluminance; and
   representing said video data presented for compression by a method which is substantially independent of relying on luminance values for determining colors used to represent the compressed data, when said duochrominance and isoluminance are not within said predetermined limits.

2. The method defined by claim 1 wherein said data presented for compression is represented by using one color per pixel when said data presented for compression is not within said limits.

3. The method defined by claim 2 wherein said step of determination if said duochrominance and isoluminance are not within said predetermined limits includes the steps of:
   computing a mean luminance for said pixel data presented for compression;
   determining the sum of the absolute differences between said mean luminance and the luminance of each pixel presented for compression.

4. The method defined by claim 3 wherein said step of determination further includes the steps of:
   determining the sum of the absolute differences between the colors of said video data presented for compression and the colors computed for use to represent said pixel data in compressed form.

5. In a compression method for compressing digital color video pixel data which uses luminance values for determining compressed color data where fewer colors are used to represent the compressed data than are found in the data presented for compression, an improvement comprising the steps of;
   determining if the digital video data presented for compression has nonlinear chrominance distribution which exceeds a predetermined threshold; and.
   representing said video data presented for compression by using a method which is substantially independent of relying on luminance values for determining colors used to represent the compressed data when said nonlinear chrominance distribution exceeds said predetermined threshold.

6. The method defined by claim 5 wherein said data presented for compression is represented by using one color per pixel when said data presented for compression exceeds said threshold.

7. The method defined by claim 6 wherein said determination of said nonlinear chrominance distribution includes the steps of:
   determining the sum of the absolute differences between colors of said video data presented for compression and colors computed for use to represent said pixel data in compressed form.

8. In a compression method for compressing digital color video data for n pixels which uses luminance values for determining compressed color data where less than n color words are used for the compressed color data, an improvement comprising the steps of:
   determining if the digital video data presented for compression has duochrominance and isoluminance which is within predetermined limits of duochrominance and isoluminance; and.
   representing said video data presented for compression by using n color words when said duochrominance and isoluminance exceeds said limits.

9. In a compression method for compressing digital color video data for n pixels which uses luminance values for determining compressed color data where less than n color words are used for the compressed color data, an improvement comprising the steps of:
   determining if the digital video data presented for compression has a nonlinear color distribution which exceeds a predetermined threshold; and
   representing said video data presented for compression by using n color words when said nonlinear color distribution exceeds said predetermined threshold.

10. In a compression method for compressing digital color video data for n pixels which uses luminance values for determining compressed color data where less than n color words are used for the compressed color data, an improvement comprising the steps of:

(a) determining if the digital video data presented for compression has duochrominance and isoluminance which is within predetermined limits of duochrominance and isoluminance;

(b) determining if the digital video data presented for compression has nonlinear color distribution which exceeds a predetermined threshold;

(c) representing said video data presented for compression by using n color words when said duochrominance and isoluminance exceeds said limits or when said nonlinear color distribution exceeds said threshold.

11. A method for decompressing color video pixel data comprising the steps of:

examining the data to determine if the data has been compressed using luminance values to compute colors which are used to represent other colors found in the data presented for compression;

decompressing the data using a decompressing algorithm for decompressing data compressed by using said luminance values if the results of said examination indicate that the data has been compressed using said luminance values;

using one color word of the data for each pixel if the results of said examination indicate that said luminance values were not used.

12. The method defined by claim 11 wherein said examination step comprises the step of examining a first bit in predetermined packets of data.

* * * * *